United States Patent
Mori et al.

(10) Patent No.: US 12,443,346 B2
(45) Date of Patent: Oct. 14, 2025

(54) MEMORY ACCESS METHOD AND MEMORY ACCESS CONTROL DEVICE

(71) Applicant: Socionext Inc., Kanagawa (JP)

(72) Inventors: Masataka Mori, Yokohama (JP); Takashi Yamamoto, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 1 day.

(21) Appl. No.: 18/740,243

(22) Filed: Jun. 11, 2024

(65) Prior Publication Data
US 2024/0329849 A1   Oct. 3, 2024

Related U.S. Application Data (63) Continuation of application No. PCT/JP2021/048185, filed on Dec. 24, 2021.

(51) Int. Cl.
   *G06F 3/06*  (2006.01)
   *G06F 12/06* (2006.01)

(52) U.S. Cl.
   CPC .......... *G06F 3/0613* (2013.01); *G06F 3/0635* (2013.01); *G06F 3/0659* (2013.01); *G06F 3/0673* (2013.01); *G06F 12/06* (2013.01)

(58) Field of Classification Search
   CPC .... G06F 3/0613; G06F 3/0635; G06F 3/0659; G06F 3/0673; G06F 12/06
   See application file for complete search history.

(56) References Cited

U.S. PATENT DOCUMENTS

| | | |
|---|---|---|
| 5,377,340 A | 12/1994 | Seroussi et al. |
| 2003/0231176 A1 | 12/2003 | Oka et al. |
| 2004/0093457 A1 | 5/2004 | Heap |

FOREIGN PATENT DOCUMENTS

| | | |
|---|---|---|
| JP | H05-210579 A | 8/1993 |
| JP | 2003-323339 A | 11/2003 |
| JP | 4771654 B2 | 9/2011 |

OTHER PUBLICATIONS

A Collins dictionary deifntion of the term subsequent captured by archive.org in Apr. 2019. (Year: 2019).*
International Search Report dated Feb. 15, 2022 issued in International Patent Application No. PCT/JP2021/048185, with English translation.

* cited by examiner

*Primary Examiner* — Tim T Vo
*Assistant Examiner* — Janice M. Girouard
(74) *Attorney, Agent, or Firm* — Rimon P.C.

(57) ABSTRACT

A memory access method includes: data storage instructing of issuing a data storage instruction instructing that, in accordance with a first logical address, one item of data be stored into a first memory or a second memory; and first storage path selecting of performing, in response to the data storage instruction, first selecting of selecting whether to execute first storing or second storing based on the first logical address included in the data storage instruction. In the first storage path selecting, the first selecting is performed based on a first interleave rule or a second interleave rule. The first selecting is performed based on the first interleave rule in response to one or more data storage instructions, and the first selecting is performed based on the second interleave rule in response to subsequent one or more data storage instructions.

18 Claims, 4 Drawing Sheets

MEMORY ACCESS METHOD AND MEMORY ACCESS CONTROL DEVICE

CROSS REFERENCE TO RELATED APPLICATION

This is a continuation application of PCT Patent Application No. PCT/JP2021/048185 filed on Dec. 24, 2021, designating the United States of America. The entire disclosure of the above-identified application, including the specification, drawings and claims is incorporated herein by reference in its entirety.

FIELD

The present disclosure relates to a memory access method and a memory access control device.

BACKGROUND

There exists a technique called memory interleaving as one of the techniques for improved memory access efficiency. Memory interleaving is a technique for improving memory access efficiency as a whole by dividing a memory into a plurality of regions that can be accessed simultaneously and by appropriately assigning the access to the memory among the plurality of regions.

For example, Patent Literature (PTL) 1 discloses a technique in which, with reference to least significant several bits of an access address (a logical address), the region to be assigned to is determined based on the information about these least significant several bits. For example, with reference to the least significant three bits, the access is assigned among eight regions based on the information on the eight patterns of the three bits. This system is easy to implement and can function as intended as long as the access mode is for consecutive addresses. In other words, this system allows for evenly assigning the access to the regions.

However, if the access mode is not for consecutive addresses but for a set of addresses where the difference in the address increases in increments of eight as in, for example, X, X+8, X+16, X+24, . . . , the above-described rule, where the information on the eight patterns of the least significant three bits and the access regions are mapped to each other, causes the same region to be accessed continually.

In this respect, PTL 2, for example, discloses a technique of working out a rule for converting an access address (a logical address) to a physical address.

CITATION LIST

Patent Literature

PTL 1: Japanese Unexamined Patent Application Publication No. H05-210579
PTL 2: Japanese Patent No. 4771654

SUMMARY

Technical Problem

The conversion rule disclosed in PTL 2 above, however, is a fixed rule and cannot be applied to a broad range of access modes, and there remains room for improvement.

Accordingly, the present disclosure provides a memory access method and so forth capable of handling a broad range of access modes.

Solution to Problem

A memory access method according to the present disclosure includes: data storage instructing of issuing a data storage instruction including a first logical address, the data storage instruction instructing that, in accordance with the first logical address, one item of data be stored into a first memory or a second memory having a physical address different from a physical address of the first memory; and first storage path selecting of performing, in response to the data storage instruction, first selecting of selecting whether to execute first storing or second storing based on the first logical address included in the data storage instruction, wherein the first storing is storing of the one item of data into the first memory via a first path in response to the data storage instruction, the second storing is storing of the one item of data into the second memory via a second path in response to the data storage instruction, and in the first storage path selecting: the first selecting is performed based on a first interleave rule or a second interleave rule that assigns a physical address to the first logical address; and the first selecting is performed based on the first interleave rule in response to one or more data storage instructions, each being the data storage instruction, and the first selecting is performed based on the second interleave rule in response to subsequent one or more data storage instructions, each being the data storage instruction.

It is to be noted that general or specific embodiments of the above may be implemented in the form of a system, a method, an integrated circuit, a computer program, or a computer readable recording medium, such as a CD-ROM, or may be implemented in the form of any desired combination of a system, a method, an integrated circuit, a computer program, and a recording medium.

Advantageous Effects

The memory access method and so forth according to one aspect of the present disclosure can handle a broad range of access modes.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

A memory access method according to one aspect of the present disclosure includes: data storage instructing of issuing a data storage instruction including a first logical address, the data storage instruction instructing that, in accordance with the first logical address, one item of data be stored into a first memory or a second memory having a physical address different from a physical address of the first memory; and first storage path selecting of performing, in response to the data storage instruction, first selecting of selecting whether to execute first storing or second storing based on the first logical address included in the data storage instruction. The first storing is storing of the one item of data into the first memory via a first path in response to the data storage instruction. The second storing is storing of the one item of data into the second memory via a second path in response to the data storage instruction. In the first storage path selecting, the first selecting is performed based on a first interleave rule or a second interleave rule that assigns a physical address to the first logical address. The first selecting is performed based on the first interleave rule in response to one or more data storage instructions, each being the data storage instruction, and the first selecting is performed based on the second interleave rule in response to subsequent one or more data storage instructions, each being the data storage instruction.

According to this configuration, the interleave rule can be switched, and this configuration makes it possible to handle a broad range of access modes.

For example, in the first storage path selecting, the first interleave rule may be switched to the second interleave rule based on a history of results of the first selecting. Specifically, in the first storage path selecting, the first interleave rule may be switched to the second interleave rule when the history of the results of the first selecting indicates that a difference between a total number of times the first storing is selected within a predetermined time and a total number of times the second storing is selected within the predetermined time is greater than a first predetermined number.

According to this configuration, as the interleave rule is switched when there is a skew in the first selecting based on the history of the first selecting of selecting which of the memories with different physical addresses the data is to be stored into, a skew is the first selecting can be suppressed. For example, it can be determined that there is a skew in the first selecting when the difference between the number of times one storing step is selected and the number of times the other storing step is selected within a predetermined time has become large.

For example, in the first storage path selecting, the first interleave rule may be switched to the second interleave rule based on a history of a plurality of first logical addresses, each being the first logical address, included in a plurality of data storage instructions, each being the data storage instruction. Specifically, in the first storage path selecting, the first interleave rule may be switched to the second interleave rule when the history of the plurality of first logical addresses shows a predetermined pattern, and the predetermined pattern may be set before a start of an access operation to the first memory or the second memory.

According to this configuration, a skew in the first selecting can be suppressed by switching the interleave rule when the history of the plurality of first logical addresses shows a predetermined pattern set in advance.

For example, in the first storing, a process of the first storing may be stopped and switched to a process of the second storing based on a predetermined condition. Specifically, the predetermined condition may be that, after the first selecting in the first storage path selecting, a total number of non-executed instances of the first storing is greater than a total number of non-executed instances of the second storing by a second predetermined number.

According to this configuration, while a process of a certain storing step is being executed, the process of this storing step can be stopped based on a predetermined condition, and the process of another storing step can then be executed. Specifically, when, after the first selecting, the number of non-executed instances of the certain storing step has become large (i.e., when there is a skew in the execution of the storing steps), the process of this certain storing step can be stopped, and the process of the other storing step can then be executed. Accordingly, a skew in the execution of the storing steps can be suppressed.

For example, the first storing may include second storage path selecting of performing second selecting of selecting whether to continue a process of the first storing or to switch to a process of the second storing, and in the second storage path selecting, the second selecting may be performed based on a third interleave rule or a fourth interleave rule. Specifically, the third interleave rule may be a rule that causes continuing of the process of the first storing to be selected a greater number of times than switching to the process of the second storing, and the fourth interleave rule may be a rule that causes the continuing of the process of the first storing to be selected a smaller number of times than the switching to the process of the second storing.

According to this configuration, the second selecting of selecting whether to continue a process of a certain storing step or to switch to a process of another storing step can be performed based on an interleave rule. Specifically, with an interleave rule, the number of instances of selecting to continue a process of a certain storing step can be increased or reduced, and a skew in the execution of the storing steps can be suppressed.

For example, in the second storage path selecting, the third interleave rule may be switched to the fourth interleave rule when, after the first selecting in the first storage path selecting, a total number of non-executed instances of the first storing is greater than a total number of non-executed instances of the second storing by a second predetermined number.

According to this configuration, by switching the interleave rule when, after the first selecting, the difference between the number of non-executed instances of one storing step and the number of non-executed instances of the other storing step has become large, a skew in the execution of the storing steps can be suppressed.

For example, in the second storage path selecting, the third interleave rule may be switched to the fourth interleave rule based on a state indicating whether access to the first memory is permitted and a state indicating whether access to the second memory is permitted. Specifically, the state indicating whether access to the first memory is permitted is based on whether the first memory is in a refresh period, and the state indicating whether access to the second memory is permitted is based on whether the second memory is in the refresh period. Alternatively, the state indicating whether access to the first memory is permitted is based on whether the first memory is in a retraining period, and the state indicating whether access to the second memory is permitted is based on whether the second memory is in the retraining period.

According to this configuration, as the interleave rule is switched when there is a memory that cannot be accessed, or specifically, when there is a memory that is in a refresh period or when there is a memory that is in a retraining period, a skew in the execution of the storing steps can be suppressed.

For example, in the second storage path selecting, the third interleave rule may be switched to the fourth interleave rule when a chip temperature of the first memory is higher than a chip temperature of the second memory by a predetermined amount.

According to this configuration, by switching the interleave rule when the difference between the chip temperature of one memory and the chip temperature of the other memory has become large, a skew in the execution of the storing steps can be suppressed.

For example, the first storage path selecting may further include first address conversion recording of recording combination information indicating a combination of the first logical address included in the data storage instruction and either the first interleave rule or the second interleave rule based on which the first selecting is performed. Alternatively, the first storage path selecting may further include second address conversion recording of recording combination information indicating a combination of the first logical address included in the data storage instruction and a physical address assigned.

Such combination information can be stored for use at the time of reading out data.

For example, the memory access method may further include: data reading instructing of issuing a data reading instruction including a second logical address, the data reading instruction instructing that, in accordance with the second logical address, one item of data be read out from the first memory or the second memory; and reading path selecting of performing, in response to the data reading instruction, third selecting of selecting whether to execute first reading or second reading based on the second logical address included in the data reading instruction. The first reading may be reading of the one item of data from the first memory via the first path in response to the data reading instruction, and the second reading may be reading of the one item of data from the second memory via the second path in response to the data reading instruction. In the reading path selecting, the third selecting may be performed based on the combination information corresponding to the first logical address that is equal to the second logical address.

According to this configuration, when data is to be read out, stored data can be read out with the use of the combination information stored when the data has been stored.

A memory access control device according to one aspect of the present disclosure includes: a data storage instructor that issues a data storage instruction including a first logical address, the data storage instruction instructing that, in accordance with the first logical address, one item of data be stored into a first memory or a second memory having a physical address different from a physical address of the first memory; a first storage that, in response to the data storage instruction, stores the one item of data into the first memory via a first path; a second storage that, in response to the data storage instruction, stores the one item of data into the second memory via a second path; and a first storage path selector that, in response to the data storage instruction, performs first selecting of selecting whether to execute storing by the first storage or storing by the second storage based on the first logical address included in the data storage instruction. The first storage path selector performs the first selecting based on a first interleave rule or a second interleave rule that assigns a physical address to the first logical address. The first storage path selector performs the first selecting based on the first interleave rule in response to one or more data storage instructions, each being the data storage instruction, and performs the first selecting based on the second interleave rule in response to subsequent one or more data storage instructions, each being the data storage instruction.

This configuration can provide a memory access control device that can handle a broad range of access modes.

Hereinafter, some embodiments will be described in specific terms with reference to the drawings.

It is to be noted that the embodiments described below merely illustrate general or specific examples. The numerical values, the shapes, the materials, the constituent elements, the arrangement positions and the connection modes of the constituent elements, the steps, the order of the steps, and so on illustrated in the following embodiments are examples and are not intended to limit the present disclosure.

Embodiment

Hereinafter, a memory access method and a memory access control device according to an embodiment will be described.

Figure 1:
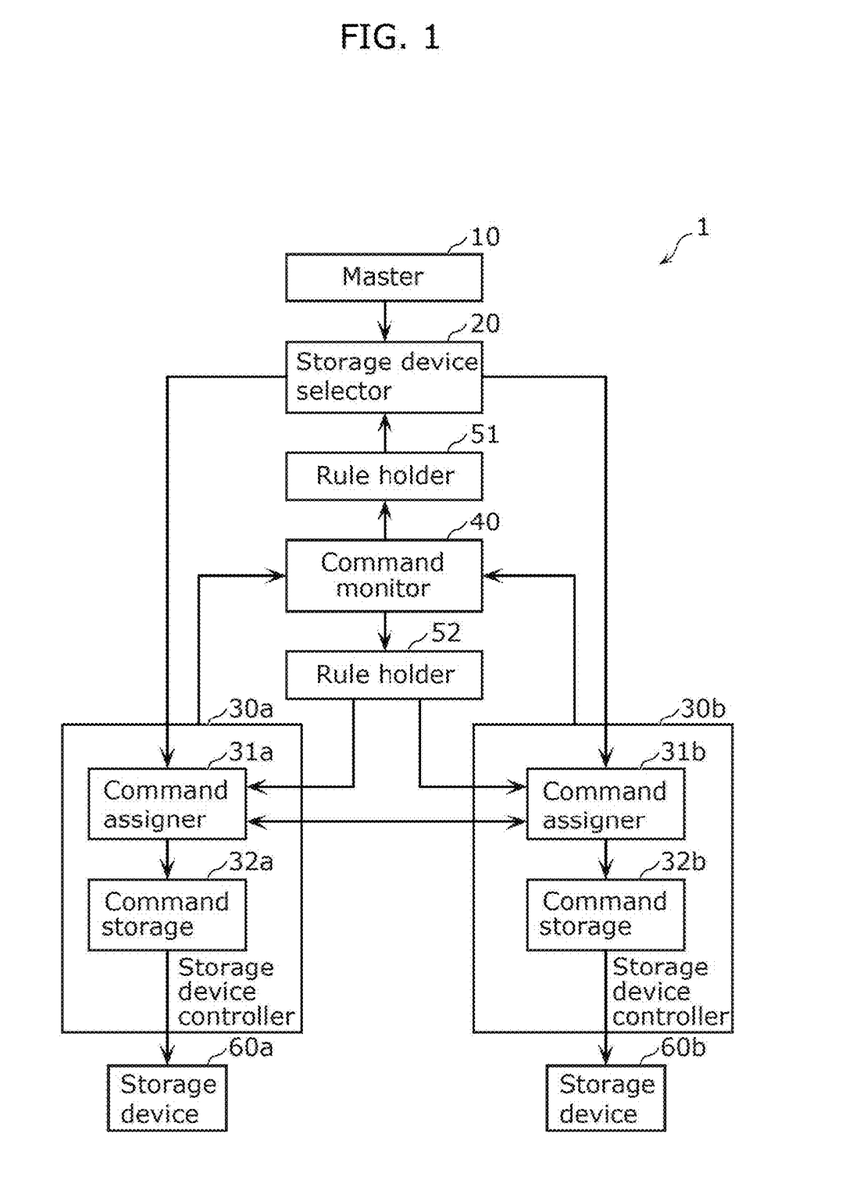
FIG. 1 is a configuration diagram showing one example of a memory access control device according to an embodiment.

FIG. 1 is a configuration diagram showing one example of memory access control device 1 according to the embodiment.

Memory access control device 1 is a device that performs memory interleaving for improved access efficiency as a whole by dividing a memory into a plurality of regions (banks) that can be accessed simultaneously and by appropriately assigning the access to the memory among the plurality of regions. For the purpose of simplifying the description, the following description primarily focuses on two regions of storage devices 60a and 60b as a plurality of regions. Alternatively, the access may be assigned among three or more regions.

Memory access control device 1 includes master 10, storage device selector 20, storage device controllers 30a and 30b, command monitor 40, and rule holders 51 and 52. Herein, memory access control device 1 may or may not include storage devices 60a and 60b. Memory access control device 1 is a computer that includes, for example but not limited to, a processor and a memory. The memory is, for example but is not limited to, a read only memory (ROM) or a random access memory (RAM) and can store a program to be executed by the processor. Master 10, storage device selector 20, storage device controllers 30a and 30b, and command monitor 40 are realized by the processor that executes the program stored in the memory. Rule holders 51 and 52 are realized, for example, by the memory or a set of registers. Herein, rule holders 51 and 52 may be a memory separate from the memory that stores the program.

Storage device 60a is a memory region, which is also referred to as a bank, and is one example of a first memory. Storage device 60b is a bank different from storage device 60a and is one example of a second memory. Storage device 60a and storage device 60b have different physical addresses.

Master 10 is one example of a data storage instructor that executes a data storage instructing step of issuing a data storage instruction instructing that one item of data be stored into storage device 60a or storage device 60b in accordance with one first logical address. A data storage instruction includes a first logical address. Furthermore, master 10 is one example of a data reading instructor that executes a data reading instructing step of issuing a data reading instruction instructing that one item of data be read out from storage device 60*a* or storage device 60*b* in accordance with one second logical address. A data reading instruction includes a second logical address.

Storage device selector 20 is a constituent element that determines an access path by converting a logical address to a physical address. Specifically, storage device selector 20 is one example of a first storage path selector that, in response to a data storage instruction, executes a first storage path selecting step of performing the selecting (first selecting) of selecting whether to execute the storing (a first storing step) by storage device controller 30*a* or the storing (a second storing step) by storage device controller 30*b* based on the first logical address included in the data storage instruction. Storage device selector 20 performs the first selecting based on a first interleave rule held in rule holder 51 or a second interleave rule held in rule holder 51 of assigning a physical address to a first logical address. Storage device selector 20 performs the first selecting in response to one or more data storage instructions and based on the first interleave rule and performs the first selecting in response to the subsequent one or more data storage instructions and based on the second interleave rule. Furthermore, storage device selector 20 is one example of a reading path selector that, in response to a data reading instruction, executes a reading path selecting step of performing third selecting of selecting whether to execute the reading (a first reading step) by storage device controller 30*a* or the reading (a second reading step) by storage device controller 30*b* based on the second logical address included in the data reading instruction.

Storage device controller 30*a* is one example of a first storage that, in response to a data storage instruction, executes a first storing step of storing one item of data into storage device 60*a* via a first path. The first path is a path connecting storage device selector 20 to storage device 60*a* via storage device controller 30*a*. Furthermore, storage device controller 30*a* is one example of a first reader that, in response to a data reading instruction, executes a first reading step of reading out one item of data from storage device 60*a* via the first path.

Furthermore, storage device controller 30*a* includes command assigner 31*a* and command storage 32*a*. As storage device controller 30*a* includes command assigner 31*a*, storage device controller 30*a* can, based on a predetermined condition, stop the process of the first storing step and switch to the process of the second storing step. The predetermined condition is that, after the first selecting in the first storage path selecting step, the number of non-executed instance of the first storing step is greater than the number of non-executed instances of the second storing step by a second predetermined number.

Command assigner 31*a* is one example of a second storage path selector that executes a second storage path selecting step of performing the selecting (referred to as second selecting) of selecting whether to continue the process by storage device controller 30*a* or to switch to the process by storage device controller 30*b*. Command assigner 31*a* performs the second selecting based on a third interleave rule held in rule holder 52 or a fourth interleave rule held in rule holder 52.

Command storage 32*a* tentatively stores an access command. An access command is stored into command storage 32*a* when command assigner 31*a* has selected to continue the process by storage device controller 30*a*. Command storage 32*a* executes an access command when the access command becomes executable, and this execution causes data to be stored into storage device 60*a*. When the execution of the access command ends, this access command is deleted from command storage 32*a*. For example, command storage 32*a* executes an access command in accordance with, for example, a state indicating whether access to storage device 60*a* is permitted. The state indicating whether access is permitted is based on whether storage device 60*a* is in a refresh period or whether storage device controller 30*a* is in the period of retraining storage device 60*a*. In this retraining period, timing adjustment and so forth are performed in storage device controller 30*a*, and normal access to storage device 60*a* being retrained is unavailable during this period. When storage device 60*a* is in a refresh period or in a retraining period, no access command stored in command storage 32*a* is executed, and access commands may accumulate in command storage 32*a*.

Storage device controller 30*b* is one example of a second storage that, in response to a data storage instruction, executes a second storing step of storing one item of data into storage device 60*b* via a second path. The second path is a path connecting storage device selector 20 to storage device 60*b* via storage device controller 30*b*. Furthermore, storage device controller 30*b* is one example of a second reader that, in response to a data reading instruction, executes a second reading step of reading out one item of data from storage device 60*b* via the second path.

Furthermore, storage device controller 30*b* includes command assigner 31*b* and command storage 32*b*. As storage device controller 30*b* includes command assigner 31*b*, storage device controller 30*b* can, based on a predetermined condition, stop the process of the second storing step and switch to the process of the first storing step. The predetermined condition is that, after the first selecting in the second storage path selecting step, the number of non-executed instances of the second storing step is greater than the number of non-executed instances of the first storing step by the second predetermined number.

Command assigner 31*b* is one example of a second storage path selector that executes a second storage path selecting step of performing the second selecting of selecting whether to continue the process by storage device controller 30*b* or to switch to the process by storage device controller 30*a*. Command assigner 31*b* performs the second selecting based on the third interleave rule held in rule holder 52 or the fourth interleave rule held in rule holder 52.

Command storage 32*b* tentatively stores an access command. An access command is stored into command storage 32*b* when command assigner 31*b* has selected to continue the process by storage device controller 30*b*. Command storage 32*b* executes an access command when the access command becomes executable, and this execution causes data to be stored into storage device 60*b*. When the execution of the access command ends, this access command is deleted from command storage 32*b*. For example, command storage 32*b* executes an access command in accordance with, for example, a state indicating whether access to storage device 60*b* is permitted. The state indicating whether access is permitted is based on whether storage device 60*b* is in a refresh period or whether storage device 60*b* is in a retraining period. When storage device 60*b* is in a refresh period or in a retraining period, no access command stored in command storage 32*b* is executed, and access commands may accumulate in command storage 32*b*.

Command monitor 40 monitors the result of the first selecting by storage device selector 20. Specifically, command monitor 40, by monitoring storage device controllers 30*a* and 30*b*, monitors the result indicating whether storage device selector 20 has selected the execution of the first storing step or the execution of the second storing step. Then, based on the history of the results of the first selecting, command monitor 40 determines an optimal interleave rule and stores the determined interleave rule into rule holder 51. For example, in a case in which another interleave rule is stored in rule holder 51, this interleave rule is overwritten with the determined interleave rule.

Furthermore, command monitor 40 monitors a plurality of first logical addresses included in a plurality of data storage instructions. Specifically, command monitor 40, by monitoring storage device controllers 30a and 30b, monitors a plurality of first logical addresses included in data storage instructions issued successively by master 10. Then, based on the history of the plurality of logical addresses, command monitor 40 determines an optimal interleave rule and stores the determined interleave rule into rule holder 51.

For example, as the interleave rule held in rule holder 51 is changed from the first interleave rule to the second interleave rule, storage device selector 20 can switch the interleave rule to use to perform the first selecting from the first interleave rule to the second interleave rule.

Furthermore, after the first selecting, command monitor 40 monitors the number of non-executed instances of the first storing step and the number of non-executed instances of the second storing step. Specifically, command monitor 40, by monitoring storage device controllers 30a and 30b, monitors the number of access commands that have not been executed for each of command storages 32a and 32b. Then, based on which of the number of non-executed access commands for storage device controllers 30a and the number of non-executed access commands for storage device controller 30b is greater, command monitor 40 determines an optimal interleave rule and stores the determined interleave rule into rule holder 52.

Furthermore, command monitor 40 monitors the state indicating whether access to storage device 60a is permitted and the state indicating whether access to storage device 60b is permitted. Specifically, command monitor 40, by monitoring storage device controllers 30a and 30b, monitors the state indicating whether command storage 32a is permitted to access storage device 60a and the state indicating whether command storage 32b is permitted to access storage device 60b. Then, based on each of the states indicating whether access is permitted, command monitor 40 determines an optimal interleave rule and stores the determined interleave rule into rule holder 52.

Furthermore, command monitor 40 monitors the chip temperature of storage device 60a and the chip temperature of storage device 60b. Specifically, although not shown in the drawings, command monitor 40, by monitoring storage devices 60a and 60b (or by monitoring the output of, for example, a sensor that performs sensing of the chip temperatures of storage devices 60a and 60b), monitors the chip temperature of storage device 60b and the chip temperature of storage device 60b. Then, based on the chip temperature of each of storage devices 60a and 60b, command monitor 40 determines an optimal interleave rule and stores the determined interleave rule into rule holder 52.

For example, as the interleave rule held in rule holder 51 is changed from the third interleave rule to the fourth interleave rule, command assigners 31a and 31b can switch the interleave rule to use to perform the second selecting from the third interleave rule to the fourth interleave rule.

Rule holder 51 holds the interleave rule determined by command monitor 40. Herein, of various interleave rules determined by command monitor 40, one interleave rule is referred to as a first interleave rule, and an interleave rule different from the first interleave rule is referred to as a second interleave rule. The first interleave rule and the second interleave rule are rules for assigning a physical address to a first logical address.

Rule holder 52 holds the interleave rule determined by command monitor 40. Herein, of various interleave rules determined by command monitor 40, one interleave rule is referred to as a third interleave rule, and an interleave rule different from the third interleave rule is referred to as a fourth interleave rule.

For example, a third interleave rule for command assigner 31a is a rule that causes the continuing of the process of the first storing step to be selected a greater number of times than the switching to the process of the second storing step. The third interleave rule is, specifically, a rule that causes the process of the first storing step to be performed three times while the process of the second storing step is performed two times or a rule that causes the process of the first storing step to be performed five times while the process of the second storing step is performed one time.

For example, a fourth interleave rule for command assigner 31a is a rule that causes the continuing of the process of the first storing step to be selected a smaller number of times than the switching to the process of the second storing step. The fourth interleave rule is, specifically, a rule that causes the process of the first storing step to be performed two times while the process of the second storing step is performed three times or a rule that causes the process of the first storing step to be performed one time while the process of the second storing step is performed five times.

Herein, the third interleave rule for command assigner 31b is a rule that causes the continuing of the process of the second storing step to be selected a greater number of times than the switching to the process of the first storing step, and the fourth interleave rule for command assigner 31b is a rule that causes the continuing of the process of the second storing step to be selected a smaller number of times than the switching to the process of the first storing step.

Next, an outline of an operation of memory access control device 1 will be described with reference to FIG. 2.

Figure 2:
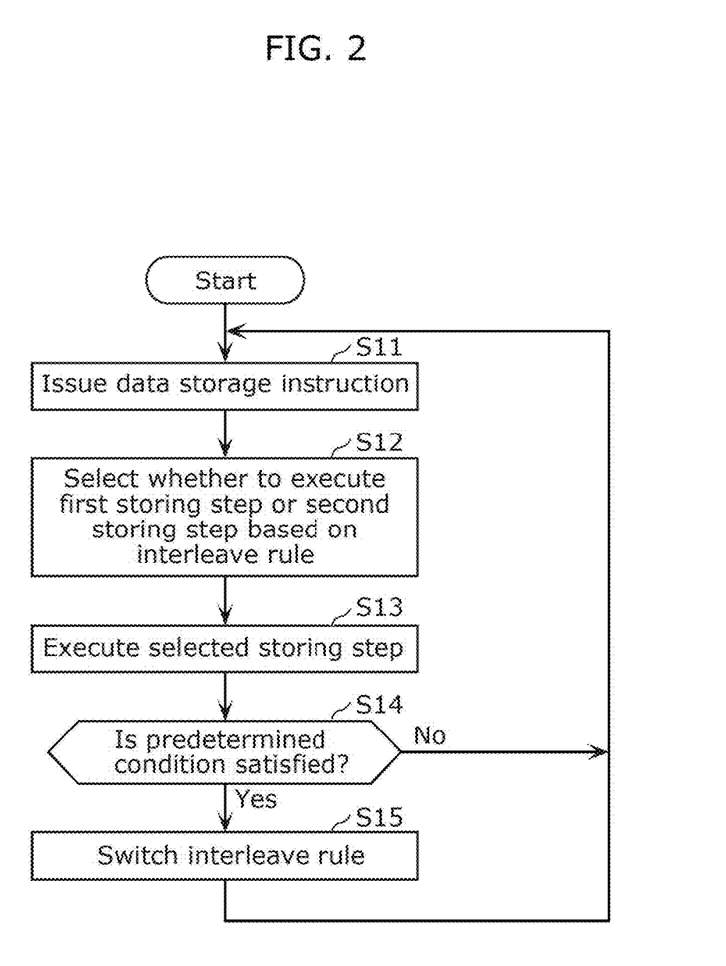
FIG. 2 is a flowchart showing one example of a memory access method according to an embodiment.

FIG. 2 is a flowchart showing one example of a memory access method according to the embodiment. Herein, the memory access method is a method executed by memory access control device 1, and thus FIG. 2 is regarded as also a flowchart showing one example of an operation of memory access control device 1 according to the embodiment.

First, master 10 issues a data storage instruction instructing that one item of data be stored into storage device 60a or storage device 60b in accordance with one first logical address (step S11: data storage instructing step).

Next, in response to the data storage instruction, storage device selector 20 performs the first selecting of selecting whether to execute the first storing step or the second storing step based on the first logical address included in the data storage instruction (step S12: first storage path selecting step). For example, storage device selector 20 performs the first selecting based on, as the logical address, only one first logical address included in one data storage instruction. Herein, storage device selector 20 may perform the first selecting based on, as the logical address, a plurality of first logical addresses included in a plurality of data storage instructions. At this point, storage device selector 20 performs the first selecting based on the first interleave rule or the second interleave rule. In this example, storage device selector 20 performs the first selecting based first on the first interleave rule.

Next, storage device controller 30a or 30b executes the selected storing step (step S13). If the first storing step has been selected to be executed, storage device controller 30a executes the first storing step. The first storing step is a step of storing, in accordance with a data storage instruction, one item of data into storage device 60a via the first path. If the second storing step has been selected to be executed, storage device controller 30b executes the second storing step. The second storing step is a step of storing, in accordance with a data storage instruction, one item of data into storage device 60b via the second path.

Next, command monitor 40 determines whether the condition for switching the interleave rule is satisfied (step S14). The condition for switching the interleave rule will be described later.

If it is determined that the condition for switching the interleave rule is not satisfied (No at step S14), the interleave rule is not switched. Then, the next data storage instruction is issued at step S11, and the processes at step S12 and thereafter are performed with the use of the same interleave rule (e.g., the first interleave rule) as the interleave rule used in the previous instance.

If it is determined that the condition for switching the interleave rule is satisfied (Yes at step S14), storage device selector 20 switches the interleave rule (step S15). Then, the next data storage instruction is issued at step S11, and the processes at step S12 and thereafter are performed with the use of an interleave rule (e.g., the second interleave rule) different from the interleave rule used in the previous instance.

In this manner, storage device selector 20 performs the first selecting in response to one or more data storage instructions and based on the first interleave rule and performs the first selecting in response to the subsequent one or more data storage instructions and based on the second interleave rule. Herein, the second selecting is made of selecting whether to continue the process of the first storing step or to switch to the process of the second storing step at step S13, and this will be described below with reference to FIG. 3.

Next, details of the operation of memory access control device 1 will be described with reference to FIG. 3.

Figure 3:
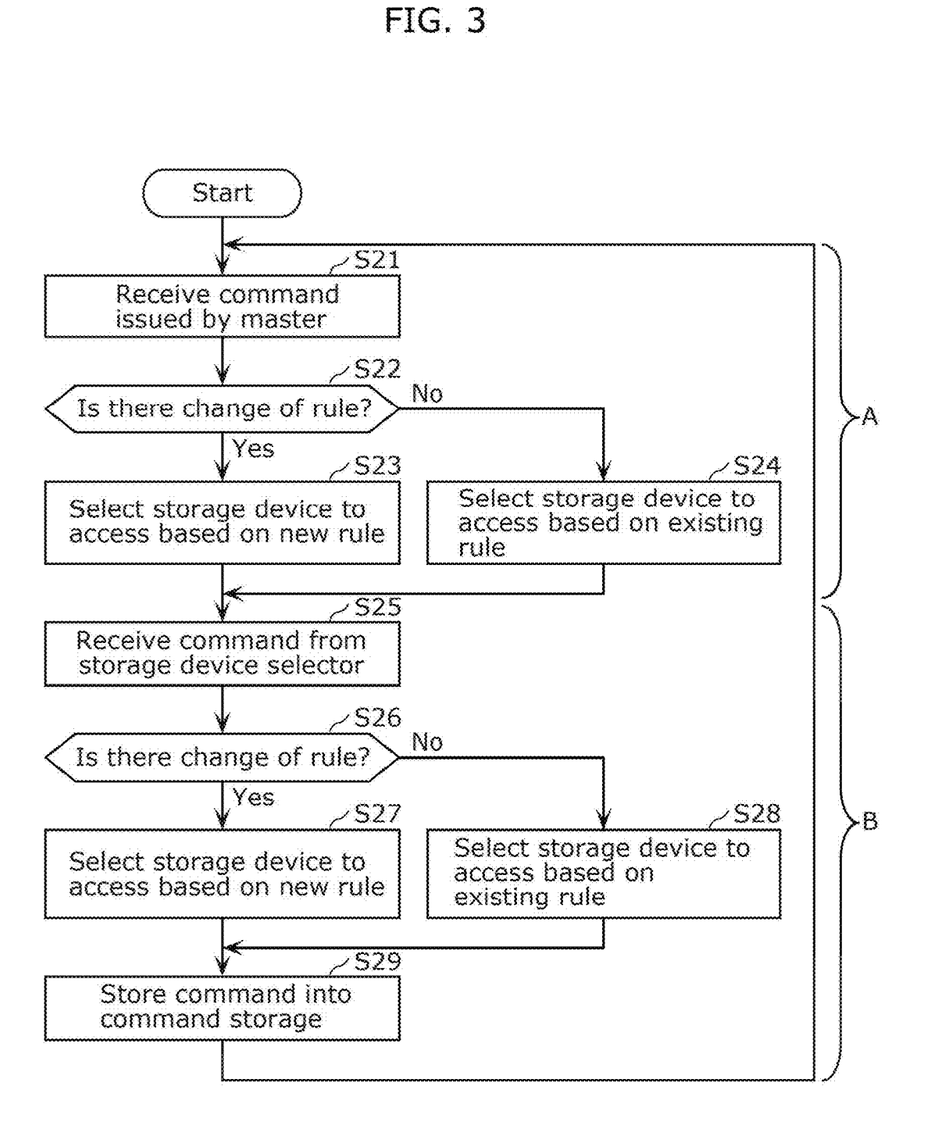
FIG. 3 is a flowchart showing a specific example of a memory access method according to an embodiment.

FIG. 3 is a flowchart showing a specific example of a memory access method according to the embodiment. Herein, FIG. 3 is regarded as also a flowchart showing a specific example of the operation of memory access control device 1 according to the embodiment. Step S21 to step S24 in the section labeled A in FIG. 3 are the processes performed by storage device selector 20, and step S25 to step S29 in the section labeled B are processes performed by storage device controller 30a or 30b (specifically, by command assigner 31a or 31b).

First, storage device selector 20 receives an access command issued by master 10 (step S21).

Next, with regard to the interleave rule held in rule holder 51, storage device selector 20 determines whether a change is to be made by command monitor 40 (step S22). For example, rule holder 51 may hold the first interleave rule.

For example, when the history of results of the first selecting indicates that the difference between the number of instances in which the first storing step has been selected within a predetermined length of time and the number of instances in which the second storing step has been selected within the predetermined length of time is greater than a first predetermined number, command monitor 40 may change the interleave rule held in rule holder 51 from the first interleave rule to the second interleave rule. In other words, when the selection by storage device selector 20 is skewed toward one of the first interleave rule and the second interleave rule within the predetermined length of time, the interleave rule may be changed from the first interleave rule to the second interleave rule.

Furthermore, if the history of a plurality of first logical addresses included in a plurality of data storage instructions shows a predetermined pattern, command monitor 40 may change the interleave rule held in rule holder 51 from the first interleave rule to the second interleave rule. The history of a plurality of first logical addresses is a history showing the plurality of first logical addresses in the respective data storage instructions arranged in the order in which the data storage instructions are issued and showing up to the first logical address included in the latest data storage instruction. The history of the plurality of first logical addresses is, for example, a history of logical addresses arranged as in " . . . 000", " . . . 001", " . . . 010", " . . . 011" (herein, only the least significant three bits of each address are shown). The predetermined pattern is, for example, a pattern observed in specific bits of the plurality of first logical addresses and is, for example, a pattern observed in the least significant bit. One specific example of the predetermined pattern is a pattern in which the least significant bits of the plurality of first logical addresses are 0, 0, 0, 0, . . . .

For example, the first interleave rule may be a rule that causes the execution of the first interleave rule to be selected when the value of the least significant bit is 0 and causes the execution of the second storing step to be selected when the value of the least significant bit is 1. Meanwhile, the second interleave rule may be a rule that causes the execution of the first storing step to be selected when the value of the bit to the left of the least significant bit is 0 and causes the execution of the second storing step to be selected when the value of the bit to the left of the least significant bit is 1. If the first interleave rule is held in rule holder 51, the least significant bits are 0, 1, 0, 1, . . . when the data storage instructions whose first logical addresses change successively as in " . . . 000", " . . . 001", " . . . 010", and " . . . 011" are issued, and the first storing step and the second storing step can be selected evenly. Meanwhile, the least significant bits are 0, 0, 0, 0, . . . when the data storage instructions whose first logical addresses change in increments of 2 as in " . . . 000", " . . . 010", " . . . 100", and " . . . 110" are issued, and only the first storing step keeps being selected, resulting in the skewed selection.

Accordingly, when the history of a plurality of first logical addresses included in a plurality of data storage instructions shows a predetermined pattern, that is, when the least significant bits of the plurality of first logical addresses are 0, 0, 0, 0, . . . , the interleave rule held in rule holder 51 is changed from the first interleave rule to the second interleave rule. This change causes the bits to the left of the least significant bits of the plurality of first logical addresses to be 0, 1, 0, 1, . . . , and thus the second interleave rule makes it possible to evenly select the first storing step and the second storing step.

For example, the predetermined pattern is set before the start of the operation of accessing storage device 60a or 60b. For example, in a case in which the type of the access mode is known to a certain extend beforehand, an interleave rule and a predetermined pattern corresponding to the type of the access mode are set, and the interleave rule is switched accordingly in response to the detection of a skew in the access.

If storage device selector 20 has determined that a change is to be made to the interleave rule held in rule holder 51 by command monitor 40 (Yes at step S22), storage device selector 20 selects the storage device to access based on the new rule (e.g., the second interleave rule) (step S23).

In response to the change of the interleave rule by command monitor 40, storage device selector 20 switches the interleave rule from the first interleave rule to the second interleave rule based on the history of the results of the first selecting. Specifically, storage device selector 20 switches the interleave rule from the first interleave rule to the second interleave rule when the history of the results of the first selecting indicates that the difference between the number of instances in which the first storing step has been selected within a predetermined length of time and the number of instances in which the second storing step has been selected within the predetermined length of time is greater than a first predetermined number. Alternatively, in response to the change of the interleave rule by command monitor 40, storage device selector 20 switches the interleave rule from the first interleave rule to the second interleave rule based on the history of a plurality of first logical addresses included in a plurality of data storage instructions. Specifically, storage device selector 20 switches the interleave rule from the first interleave rule to the second interleave rule when the history of the plurality of first logical addresses shows a predetermined pattern.

If storage device selector 20 has determined that no change is to be made to the interleave rule held in rule holder 51 by command monitor 40 (No at step S22), storage device selector 20 selects the storage device to access based on the existing rule (e.g., the first interleave rule) (step S24).

Next, command assigner 31a or 31b receives an access command from storage device selector 20 (step S25). In this example, storage device selector 20, for example, selects the first storing step as the first selecting, and command assigner 31a receives an access command.

Next, command assigner 31a determines whether a change is to be made to the interleave rule held in rule holder 52 by command monitor 40 (step S26). For example, rule holder 52 may hold the third interleave rule.

For example, command monitor 40 may change the interleave rule held in rule holder 52 from the third interleave rule to the fourth interleave rule when, after the first selecting by storage device selector 20, the number of non-executed instances of the first storing step is greater than the number of non-executed instances of the second storing step by a second predetermined number. In other words, the interleave rule may be changed from the third interleave rule to the fourth interleave rule when the number of non-executed access commands stored in command storage 32a is greater than the number of non-executed access commands stored in command storage 32b by the second predetermined number.

Furthermore, for example, command monitor 40 may change the interleave rule held in rule holder 52 from the third interleave rule to the fourth interleave rule based on the state indicating whether access to storage device 60a is permitted and the state indicating whether access to storage device 60b is permitted. For example, the interleave rule may be changed from the third interleave rule to the fourth interleave rule when the state indicating whether access to storage device 60a is permitted indicates that storage device 60a is in a refresh period or in a retraining period and when the state indicating whether access to storage device 60b is permitted indicates that storage device 60b is not in a refresh period or in a retraining period. When storage device 60a is in a refresh period or in a retraining period, it is not possible to store data into storage device 60a by executing an access command stored in command storage 32a, and the number of non-executed access commands stored in command storage 32a may become greater than the number of non-executed access commands stored in command storage 32b. In such a case, the interleave rule may be changed from the third interleave rule to the fourth interleave rule.

Furthermore, for example, command monitor 40 may change the interleave rule held in rule holder 52 from the third interleave rule to the fourth interleave rule when the chip temperature of storage device 60a is higher than the chip temperature of storage device 60b by a predetermined amount. When the chip temperature of storage device 60a is high, this may mean that the access commands stored in command storage 32a are executed at high frequency, and access commands continue to be stored into command storage 32a one after another, and thus the number of non-executed access commands stored in command storage 32a may have become greater than the number of non-executed access commands stored in command storage 32b. In such a case, the interleave rule may be changed from the third interleave rule to the fourth interleave rule.

If command assigner 31a has determined that a change is to be made to the interleave rule held in rule holder 52 by command monitor 40 (Yes at step S26), command assigner 31a selects the storage device to access based on the new rule (e.g., the fourth interleave rule) (step S27). In this case, for example, command assigner 31a refrains from storing an access command into command storage 32a and stores an access command into command storage 32b (step S29).

In response to the change of the interleave rule by command monitor 40, command assigner 31a switches the interleave rule from the third interleave rule to the fourth interleave rule when, after the first selecting by storage device selector 20, the number of non-executed instances of the first storing step is greater than the number of non-executed instances of the second storing step by the second predetermined number. Alternatively, in response to the change of the interleave rule by command monitor 40, command assigner 31a switches the interleave rule from the third interleave rule to the fourth interleave rule based on the state indicating whether access to storage device 60a is permitted and the state indicating whether access to storage device 60b is permitted. Alternatively, in response to the change of the interleave rule by command monitor 40, command assigner 31a switches the interleave rule from the third interleave rule to the fourth interleave rule when the chip temperature of storage device 60a has become higher than the chip temperature of storage device 60b by a predetermined amount.

If command assigner 31a has determined that no change is to be made to the interleave rule held in rule holder 52 by command monitor 40 (No at step S26), command assigner 31a selects the storage device to access based on the existing rule (e.g., the third interleave rule) (step S28). In this case, for example, command assigner 31a continues to store an access command into command storage 32a (step S29).

Now, a reason why, after storage device selector 20 has selected which of storage devices 60a and 60b data should be stored into, command assigners 31a and 31b again select which of storage devices 60a and 60b data should be stored into will be described.

For example, if storage device selector 20 works to store data evenly into storage device 60a and storage device 60b, command assigners 31a and 31b may seem unnecessary. However, although only one master 10 is shown in this example, storage device controllers 30a and 30b may receive access commands from a plurality of masters, and in that case, the execution of the storing steps may become skewed toward one of storage device controller 30a and storage device controller 30b, and the access efficiency may decrease. Furthermore, for example, the execution of the storing steps may be skewed and the access efficiency may decrease depending also on the state indicating whether access to storage devices 60a and 60b is permitted (whether storage devices 60a and 60b are in a refresh period or in a retraining period) or for any other reasons. Therefore, which of storage devices 60a and 60b data should be stored into is also selected in command assigners 31a and 31b. Herein, the state indicating whether access is permitted can be determined also from, for example, the state of each of storage device controllers 30a and 30b. Furthermore, when there is a skew in the access for some reason, this as a result causes the temperature of the memory chip of the storage device with a higher access frequency becomes higher than that of the other, and this fact helps to find the chip temperatures. Thus, uneven access can be determined.

Next, the memory access method and an operation of memory access control device 1 performed when data is read out will be described with reference to FIG. 4. In order to read out data, storage device selector 20, when storing data, executes a first address conversion recording step of recording combination information indicating a combination of the first logical address included in the data storage instruction and the one of the first interleave rule and the second interleave rule based on which the first selecting has been performed. Alternatively, storage device selector 20, when storing data, execute a second address conversion recording step of recording combination information indicating a combination of the first logical address included in the data storage instruction and the assigned physical address. Furthermore, command assigners 31a and 31b, when storing data, executes a third address conversion recording step of recording combination information indicating a combination of the first logical address included in the data storage instruction and the one of the third interleave rule and the fourth interleave rule based on which the second selecting has been performed. Herein, the second address conversion recording step of recording combination information indicating a combination of the first logical address included in the data storage instruction and the assigned physical address may be executed by command assigners 31a and 31b.

Figure 4:
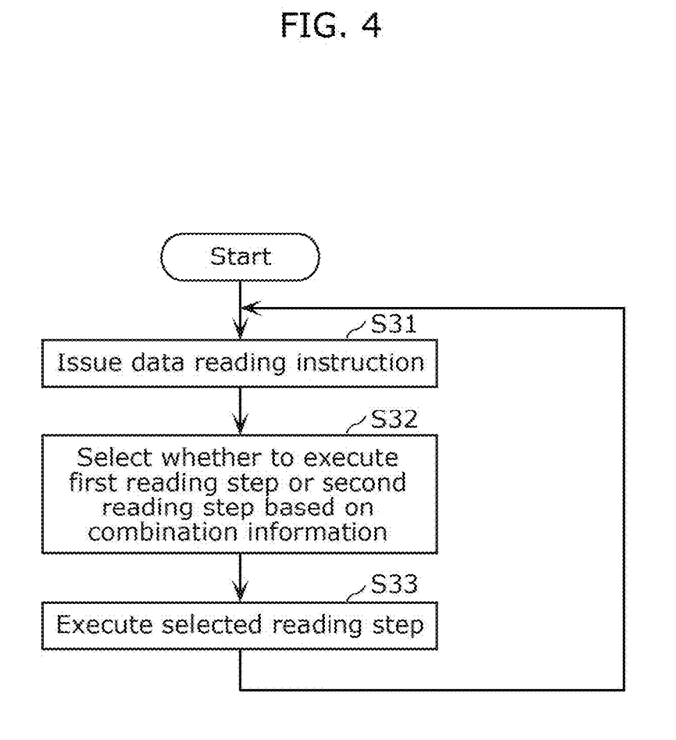
FIG. 4 is a flowchart showing one example of a process performed at readout in a memory access method according to an embodiment.

FIG. 4 is a flowchart showing one example of a process performed at readout in the memory access method according to the embodiment. Herein, FIG. 4 is regarded as also a flowchart showing one example of the operation performed at readout by memory access control device 1 according to the embodiment.

First, master 10 issues a data reading instruction instructing that one item of data be read out from storage device 60a or storage device 60b in accordance with one second logical address (step S31: data reading instructing step).

Next, in response to the data reading instruction, storage device selector 20 performs third selecting of selecting whether to execute a first reading step or a second reading step based on the second logical address included in the data reading instruction (step S32: reading path selecting step). Herein, storage device selector 20 performs the third selecting based on the combination information corresponding to the first logical address that is equal to the second logical address. In other words, when data is read out in accordance with a second logical address that is equal to the first logical address held at the time of storing data, information used at the time of storing the data is referred to.

Then, storage device controller 30a or 30b executes the selected reading step (step S33). If the execution of the first reading step is selected, storage device controller 30a executes the first reading step. The first reading step is a step of, in response to a data reading instruction, reading out one item of data from storage device 60a via the first path. If the execution of the second reading step is selected, storage device controller 30b executes the second reading step. The second reading step is a step of, in response to a data reading instruction, reading out one item of data from storage device 60b via the second path.

In this manner, when data is to be read out, stored data can be read out with the use of the combination information stored when the data has been stored.

As described above, with the memory access method and memory access control device 1 according to the present disclosure, the interleave rule can be switched, and this makes it possible to handle a broad range of access modes. Furthermore, as the first selecting of selecting whether to execute the first storing step or the second storing step is performed based on the switchable interleave rule, any skew in the first selecting can be suppressed. Furthermore, as the second selecting of selecting whether to continue the process of the first storing step or to switch to the process of the second storing step is performed after the first selecting, any skew in the execution of the storing steps can be suppressed. In this manner, the access efficiency can be improved.

Other Embodiments

Thus far, the memory access method and memory access control device 1 according to one or more aspects of the present disclosure have been described based on the embodiment, but this embodiment does not limit the present disclosure. Unless departing from the spirit of the present disclosure, an embodiment obtained by making various modifications that a person skilled in the art can conceive of to the foregoing embodiment or an embodiment obtained by combining the constituent elements in different embodiments may also be encompassed by the scope of the one or more aspects of the present disclosure.

For example, although the process of the first storing step is stopped and the switch is made over to the process of the second storing step in the first storing step in the example described according to the foregoing embodiment, such a switching does not have to be made. In other words, memory access control device 1 does not have to include command assigners 31a and 31b.

For example, the present disclosure can be implemented in the form of a program that causes a processor to execute the steps included in the memory access method. Furthermore, the present disclosure can be implemented in the form of a non-transitory computer readable recording medium, such as a CD-ROM, that stores such a program.

For example, when the present disclosure is implemented in the form of a program (software), each step is executed as the program is executed by use of hardware resources, such as a CPU, a memory, and an input and output circuit, of a computer. In other words, each step is executed as the CPU retrieves data from the memory, the input and output circuit, or the like and performs an arithmetic operation on the data or as the CPU outputs the outcome of the arithmetic operation to the memory, the input and output circuit, or the like.

In the foregoing embodiment, the constituent elements included in memory access control device 1 may each be implemented by a dedicated piece of hardware or may each be implemented through the execution of a software program suitable for the corresponding constituent element. The constituent elements may each be implemented as a program executing unit, such as a CPU or a processor, reads out a software program recorded on a recording medium, such as a hard disk or a semiconductor memory, and executes the software program.

A part or the whole of the functions of memory access control device 1 according to the foregoing embodiment may be implemented typically in the form of a large scale integration (LSI) circuit, or an integrated circuit. These functions may each be implemented by a single chip, or a part or the whole of these functions may be implemented by a single chip. The technique for circuit integration is not limited to LSI, and an integrated circuit may be implemented by a dedicated circuit or a general purpose processor. A field programmable gate array (FPGA) that can be programmed after an LSI circuit is manufactured or a reconfigurable processor in which the connection or the setting of the circuit cell within the LSI circuit can be reconfigured may also be used.

Furthermore, unless departing from the spirit of the present disclosure, a range of variations obtained by making modifications to the embodiments of the present disclosure within the scope that a person skilled in the art can conceive of are also encompassed by the present disclosure.

INDUSTRIAL APPLICABILITY

The present disclosure can be applied to, for example but not limited to, devices that perform memory interleaving.

The invention claimed is:

1. A memory access method comprising:
    data storage instructing of issuing a data storage instruction including a first logical address, the data storage instruction instructing that, in accordance with the first logical address, one item of data be stored into a first memory or a second memory having a physical address different from a physical address of the first memory; and
    first storage path selecting of performing, in response to the data storage instruction, first selecting of selecting whether to execute first storing or second storing based on the first logical address included in the data storage instruction, wherein
    the first storing is storing of the one item of data into the first memory via a first path in response to the data storage instruction,
    the second storing is storing of the one item of data into the second memory via a second path in response to the data storage instruction, and
    in the first storage path selecting:
        the first selecting is performed based on a first interleave rule or a second interleave rule that assigns a physical address to the first logical address; and
        the first selecting is performed based on the first interleave rule in response to one or more data storage instructions, each being the data storage instruction, and the first selecting is performed based on the second interleave rule in response to subsequent one or more data storage instructions, each being the data storage instruction.

2. The memory access method according to claim 1, wherein
    in the first storage path selecting, the first interleave rule is switched to the second interleave rule based on a history of results of the first selecting.

3. The memory access method according to claim 2, wherein
    in the first storage path selecting, the first interleave rule is switched to the second interleave rule when the history of the results of the first selecting indicates that a difference between a total number of times the first storing is selected within a predetermined time and a total number of times the second storing is selected within the predetermined time is greater than a first predetermined number.

4. The memory access method according to claim 1, wherein
    in the first storage path selecting, the first interleave rule is switched to the second interleave rule based on a history of a plurality of first logical addresses, each being the first logical address, included in a plurality of data storage instructions, each being the data storage instruction.

5. The memory access method according to claim 4, wherein
    in the first storage path selecting, the first interleave rule is switched to the second interleave rule when the history of the plurality of first logical addresses shows a predetermined pattern, and
    the predetermined pattern is set before a start of an access operation to the first memory or the second memory.

6. The memory access method according to claim 1, wherein
    in the first storing, a process of the first storing is stopped and switched to a process of the second storing based on a predetermined condition.

7. The memory access method according to claim 6, wherein
    the predetermined condition is that, after the first selecting in the first storage path selecting, a total number of non-executed instances of the first storing is greater than a total number of non-executed instances of the second storing by a second predetermined number.

8. The memory access method according to claim 1, wherein
    the first storing includes second storage path selecting of performing second selecting of selecting whether to continue a process of the first storing or to switch to a process of the second storing, and
    in the second storage path selecting, the second selecting is performed based on a third interleave rule or a fourth interleave rule.

9. The memory access method according to claim 8, wherein
    the third interleave rule is a rule that causes continuing of the process of the first storing to be selected a greater number of times than switching to the process of the second storing, and
    the fourth interleave rule is a rule that causes the continuing of the process of the first storing to be selected a smaller number of times than the switching to the process of the second storing.

10. The memory access method according to claim 8, wherein
    in the second storage path selecting, the third interleave rule is switched to the fourth interleave rule when, after the first selecting in the first storage path selecting, a total number of non-executed instances of the first storing is greater than a total number of non-executed instances of the second storing by a second predetermined number.

11. The memory access method according to claim 8, wherein in the second storage path selecting, the third interleave rule is switched to the fourth interleave rule based on a state indicating whether access to the first memory is permitted and a state indicating whether access to the second memory is permitted.

12. The memory access method according to claim 11, wherein the state indicating whether access to the first memory is permitted is based on whether the first memory is in a refresh period, and the state indicating whether access to the second memory is permitted is based on whether the second memory is in the refresh period.

13. The memory access method according to claim 11, wherein the state indicating whether access to the first memory is permitted is based on whether the first memory is in a retraining period, and the state indicating whether access to the second memory is permitted is based on whether the second memory is in the retraining period.

14. The memory access method according to claim 8, wherein in the second storage path selecting, the third interleave rule is switched to the fourth interleave rule when a chip temperature of the first memory is higher than a chip temperature of the second memory by a predetermined amount.

15. The memory access method according to claim 1, wherein the first storage path selecting further includes first address conversion recording of recording combination information indicating a combination of the first logical address included in the data storage instruction and either the first interleave rule or the second interleave rule based on which the first selecting is performed.

16. The memory access method according to claim 1, wherein the first storage path selecting further includes second address conversion recording of recording combination information indicating a combination of the first logical address included in the data storage instruction and a physical address assigned.

17. The memory access method according to claim 15, further comprising:

data reading instructing of issuing a data reading instruction including a second logical address, the data reading instruction instructing that, in accordance with the second logical address, one item of data be read out from the first memory or the second memory; and reading path selecting of performing, in response to the data reading instruction, third selecting of selecting whether to execute first reading or second reading based on the second logical address included in the data reading instruction, wherein the first reading is reading of the one item of data from the first memory via the first path in response to the data reading instruction, the second reading is reading of the one item of data from the second memory via the second path in response to the data reading instruction, and in the reading path selecting, the third selecting is performed based on the combination information corresponding to the first logical address that is equal to the second logical address.

18. A memory access control device comprising:

a data storage instructor that issues a data storage instruction including a first logical address, the data storage instruction instructing that, in accordance with the first logical address, one item of data be stored into a first memory or a second memory having a physical address different from a physical address of the first memory;

a first storage that, in response to the data storage instruction, stores the one item of data into the first memory via a first path;

a second storage that, in response to the data storage instruction, stores the one item of data into the second memory via a second path; and a first storage path selector that, in response to the data storage instruction, performs first selecting of selecting whether to execute storing by the first storage or storing by the second storage based on the first logical address included in the data storage instruction, wherein the first storage path selector:

performs the first selecting based on a first interleave rule or a second interleave rule that assigns a physical address to the first logical address; and performs the first selecting based on the first interleave rule in response to one or more data storage instructions, each being the data storage instruction, and performs the first selecting based on the second interleave rule in response to subsequent one or more data storage instructions, each being the data storage instruction.

\* \* \* \* \*